United States Patent [19]

Greenbaum

[11] Patent Number: 4,967,278
[45] Date of Patent: Oct. 30, 1990

[54] VIDEO CAMERA WITH A TRANSVERSE TILT DETECTOR AND INDICATOR COMPRISING AN ORDERED ARRAY OF LIGHT-EMITTING DIODES

[76] Inventor: Steve Greenbaum, 673 E. Eighth St., South Boston, Mass. 02127

[21] Appl. No.: 229,251

[22] Filed: Aug. 8, 1988

[51] Int. Cl.⁵ .............................................. H04N 5/225
[52] U.S. Cl. ................................... 358/224; 358/229; 358/906
[58] Field of Search .................... 358/224, 213.13, 229, 358/906

[56] References Cited

U.S. PATENT DOCUMENTS 4,739,411  4/1988  Bolton .......................... 358/213.13

FOREIGN PATENT DOCUMENTS 74269   6/1980  Japan .
46672   3/1985  Japan .
141862  6/1987  Japan .
46075   2/1988  Japan .

*Primary Examiner*—James J. Groody
*Assistant Examiner*—Robert M. Bauer
*Attorney, Agent, or Firm*—John H. Faro

[57] ABSTRACT

A video camera comprising an optical-to-video conversion means having a longitudinal optical axis, a viewfinder cooperating with the conversion means, and means for detecting and indicating the transverse tilt of the camera in one of a plurality of successive angular increments. The tilt indicator includes means, such as a plurality of light-emitting diodes in an ordered array viewable in the viewfinder and operative to indicate visually the transverse tilt of the camera.

8 Claims, 2 Drawing Sheets

VIDEO CAMERA WITH A TRANSVERSE TILT DETECTOR AND INDICATOR COMPRISING AN ORDERED ARRAY OF LIGHT-EMITTING DIODES

BACKGROUND OF THE INVENTION

1. Field of the Invention

This invention relates to a novel video camera, and particularly to a video camera having an integral transverse tilt detector and a transverse tilt indicator that is viewable in the viewfinder of the camera.

2. Description of the Prior Art

A video camera comprises an optical-to-electronic conversion means having a longitudinal optical axis. The conversion means may include an optical system which focuses an image on the target or targets of one or more pickup tubes. The pickup tube or tubes generate electronic signals which are processed by associated circuitry to produce video signals usable in a particular video system to produce video images. The longitudinal optical axis is the axis through the center of the optical system. The transverse direction is normal to the longitudinal axis and parallels the horizontal lines and/or horizon line desired in the optical image incident on the target or targets.

Some video cameras are portable and, because of their size and weight, are carried on a shoulder rest on the camera operator's shoulder in such manner that the eyepiece of the camera's viewfinder is opposite the operator's right eye. The viewfinder is a closed, dark chamber containing a small video picture tube having a viewing screen which displays a video image that is a reproduction of the image that is incident on the target or targets of the pickup tube or tubes. The area adjacent to the screen of the picture tube contains various indicators. Both the picture tube and the adjacent indicator area are viewable through the eyepiece of the viewfinder.

The camera operator's attention is concentrated on what he sees in the viewfinder. Frequently, the operator would like to know whether the transverse direction of the camera is level, or is tilted from horizontal. Matching horizontal lines in the video image with the top or bottom edge of the picture-tube bezel yields inaccurate results. A transverse tilt indicator that displays the actual degrees from level or from the horizon gives more information than the operator needs. An indicator that provides a marker on a scale requires interpretation by the operator and too much of the operator's attention. Both such indicators and their associated detectors are complex and expensive. What is needed is a transverse tilt indicator, and an associated transverse tilt detector, which is simple and inexpensive to integrate into the camera, and provides an adequate amount of information with respect to the transverse tilt of the camera.

OBJECTS OF THE INVENTION

An object of this invention is to provide a novel video camera having a transverse tilt detector and indicator.

A further object is to provide a novel video camera having a transverse tilt indicator that is viewable in the viewfinder.

Another object is to provide a novel video camera having a transverse tilt indicator and associated tilt detector that is simple and inexpensive to integrate into the camera.

A still further object is to provide a novel video camera having means for indicating the transverse tilt of the camera in one of a plurality of successive angular increments.

Still another object is to provide a novel video camera having a means, responsive to gravity, for sensing the transverse tilt of the camera in one of a plurality of successive angular increments, and an associated means for indicating to the camera operator the sensed transverse tilt of the camera.

SUMMARY OF THE INVENTION

The foregoing and other objects may be achieved with the novel video camera which includes an optical-to-video image conversion means having a longitudinal optical axis, and a viewfinder cooperating with the conversion means, as in prior video cameras. Unlike prior video cameras, the novel camera includes an integral transverse tilt detector and an integral transverse tilt indicator.

The tilt detector includes a means, preferably responsive to gravity, in the camera for detecting the transverse tilt of the camera in one of a plurality of successive angular increments. In one form of the invention, the detector comprises a plurality of optical switches arranged so that one or two adjacent switches are "on" in each of the plurality of adjacent angular increments.

The tilt indicator includes means, such as a plurality of light-emitting diodes, or LEDs, arranged in an ordered array, and viewable in the viewfinder to indicate visually the transverse tilt of the camera. The LEDs are connected to be responsive to the detector to indicate the detected angular increment. In one form of the invention, the viewfinder includes a picture tube and the LEDs arranged in a linear array adjacent to the picture-tube screen, so that the screen and the LEDs are simultaneously viewable in the viewfinder.

The tilt detector and tilt indicator of the novel camera can be fabricated from inexpensive, readily-available small parts and can be integrated into the camera without compromising any of the functions of the other camera parts. With the indicator viewable in the viewfinder, the operator can quickly determine any substantial transverse tilt of the camera, without the need for reading a scale, without the need to evaluate or interpolate a reading, and without removing his attention from the viewfinder.

DETAILED DESCRIPTION OF THE INVENTION INCLUDING THE PREFERRED EMBODIMENTS

Figure 1:
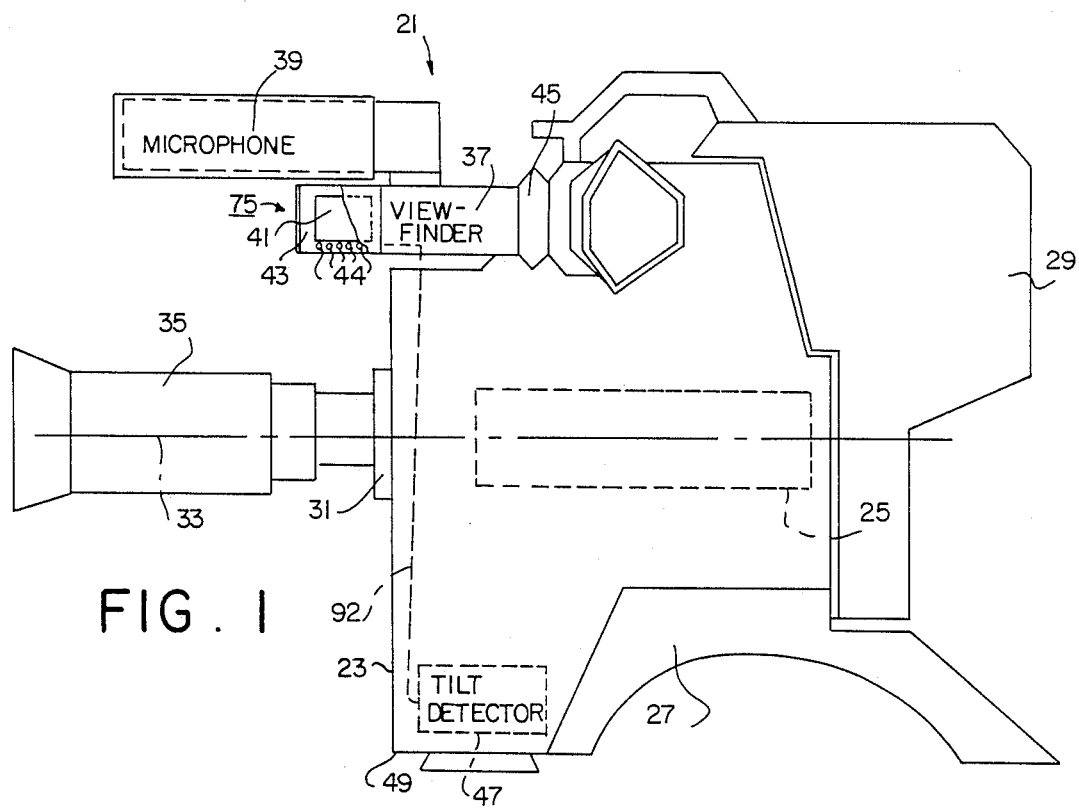
FIG. 1 is a side elevational view of a typical video camera with the viewfinder thereof partly broken-away showing the positions of the viewing screen of the viewfinder, the transverse tilt indicator and the transverse tilt detector therein.

The following description of some of the preferred embodiments of the concepts of this invention is made in reference to the accompanying figures. Where an individual structural element is depicted in more than one figure, it is assigned a common reference numeral for simplification of identification and understanding.

Any video camera may be equipped with a transverse tilt detector and tilt indicator according to the invention. However, the tilt indicator will find its greatest utility in portable video cameras in which the viewfinder includes a small picture tube. Video cameras, in general, include a lens mounting in which a lens assembly is mounted for focussing a light image on the one or more photosensitive targets, which are part of the optical-to-electronic conversion means. For purposes of the present invention, the longitudinal optical axis of the lens mounting, and therefore of the lens assembly also, is the appropriate reference line. Another reference line used herein is a plumb line, which is true vertical as determined by gravity. The longitudinal optical axis of the lens mounting is said to be level when it is horizontal; that is, when the longitudinal axis is in a plane at a right angle to a plumb line. A transverse axis of the camera is normal to the longitudinal axis. When the transverse axis is normal to a plumb line, there is no transverse tilt to the camera. In this condition, the horizontal lines in the incident light image parallel the horizontal direction of the target of the camera. The tilt indicator described below will indicate the transverse tilt of the camera in one or two adjacent angular increments.

FIG. 1 is a side view of a BVP-3A/30 Series portable video color camera (21) marketed by Sony Corporation, San Diego, Calif., modified according to the invention. This camera (21) includes a chassis (23) containing three ⅔-inch pickup tubes (25), a shoulder rest (27), a plug-in adapter (29), a lens mounting (31) having a longitudinal optical axis (33), a demountable lens assembly (35) mounted in the lens mounting (31), a viewfinder (37) and a microphone (39), as previously provided.

Figure 2:
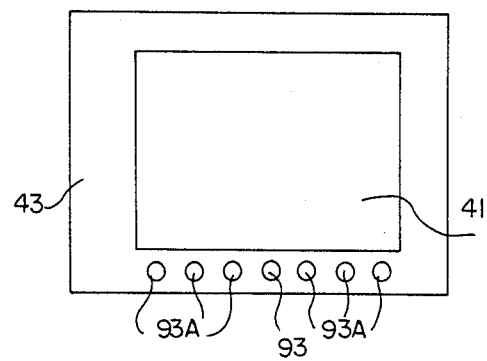
FIG. 2 is a front elevational view of the picture tube and adjacent indicator areas that can be viewed in the viewfinder shown in FIG. 1, showing the linear array of LEDs of the tilt indicator.

The viewfinder (37) is a closed chamber having a video picture tube (41) therein, an indicator area (43) around the picture tube (41) and an eyepiece (45) by which the operator can view the screen of the picture tube (41) and the indicator area (43). There is a transverse tilt indicator (44) in the indicator area (43) below the picture tube (41). In FIG. 1, the viewfinder (37) is partially broken away showing the screen of the picture tube (41) and the indicator area (43). The entire field viewed through the eyepiece (45) is shown enlarged in FIG. 2.

Figure 3:
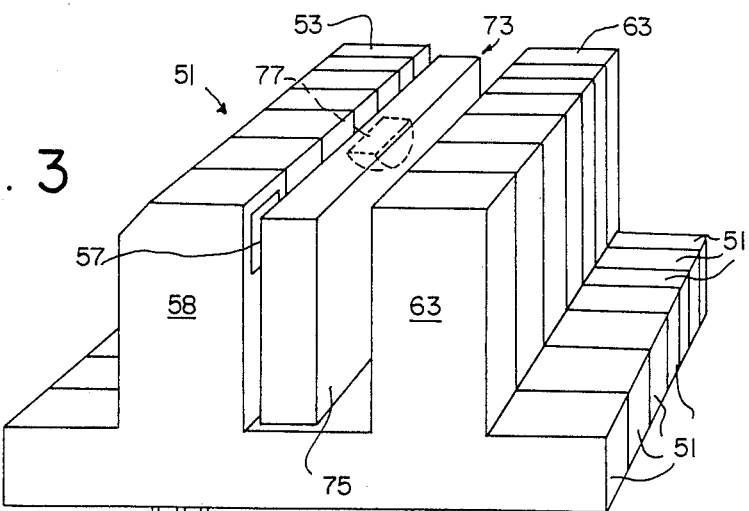
FIG. 3 is a perspective view of the optocoupled interrupter modules comprising the tilt detector shown in FIG. 1.
Figure 4:
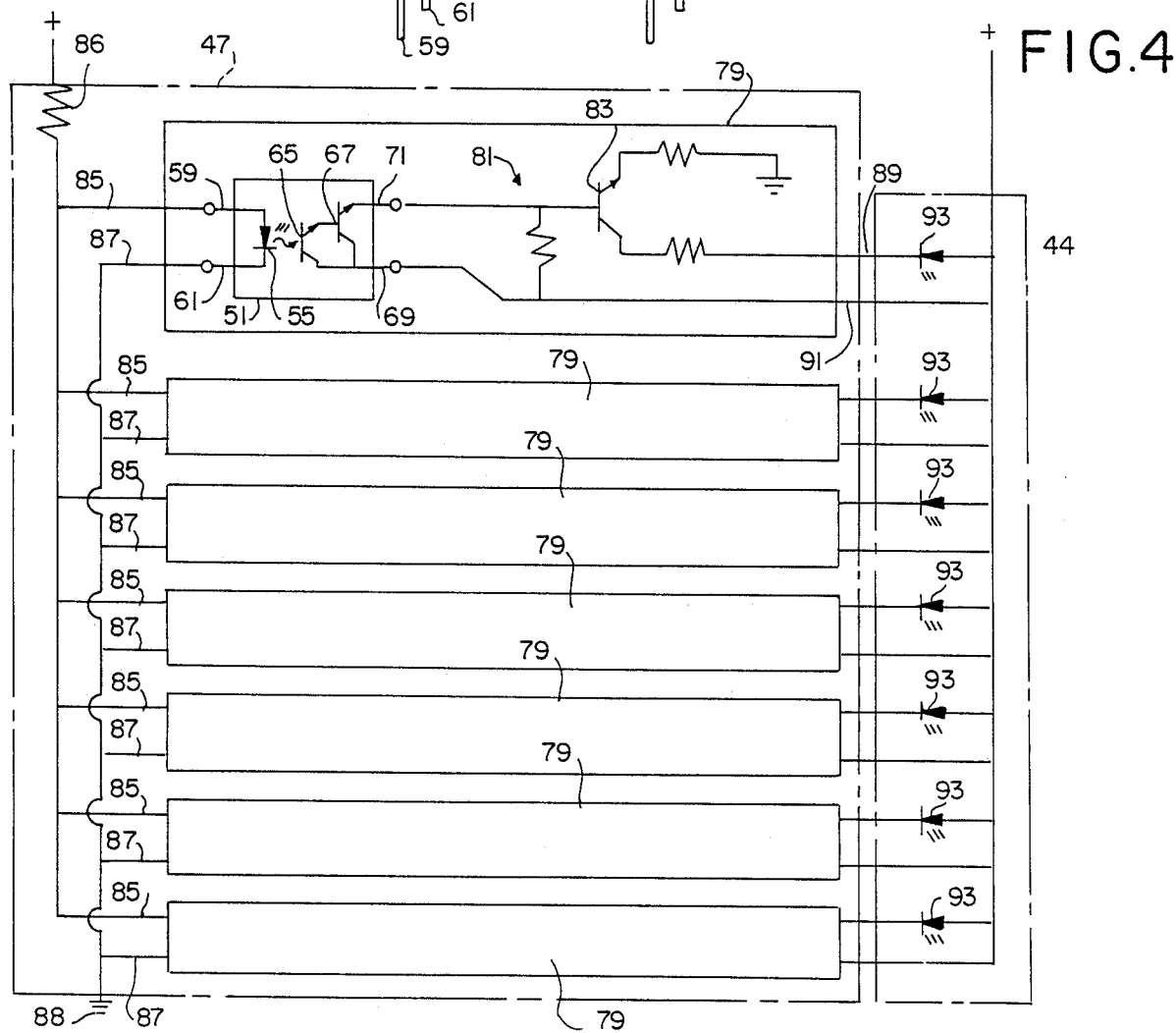
FIG. 4 is an electric circuit for the detector and the indicator shown in FIG. 1.

A transverse axis tilt detector (47) is mounted in a fixed position inside the chassis (23) on the bottom wall (49).thereof. The tilt detector (47), includes a tilt-sensitive mechanism whose structure is shown in FIG. 3 and whose circuit is shown in FIG. 4. The mechanism includes seven (7) identical optocoupled interrupter modules (51) fixed side-by-side with one another in the transverse direction of the camera. Each module (51) is a Philips ECG 3101 device, which is nominally 0.433 inch high, 0.246 inch wide and has a slot 0.129 inch wide. Each module (51) includes an upstanding transmitter arm (53) containing a transmitter LED (55) and a transmitter window (57) facing into the slot. Input connection means in the form of two input legs (59) and (61) connect to each transmitter LED (55) and extend out of the module (51). Each module (51) includes an upstanding receiver arm (63) containing a window (not shown) facing the transmitter window (57), a photo transistor (65) and an amplifying transistor (67) connected as shown in FIG. 4. Output connection means in the form of two output legs (69) and (71) connect to each amplifying transistor (67) and extend out of the modules (51). When the light path between each transmitter LED (55) and its optocoupled photo transistor (65) is not blocked, the photo transistor (65) and amplifying transistor (67) are conducting, otherwise they are not conducting.

As shown in FIGS. 1 and 3, the array of slots in the modules (51) are aligned with one another in a transverse direction to the longitudinal axis (33) of the camera. A tilt-sensitive window unit (73) is fixedly positioned in the slot. The window unit (73) includes a sealed container (75), having parallel transparent sides of plastic or glass, and containing a light-absorbing liquid; for example, India ink diluted with ethyl alcohol, and having a bubble (77) therein. The window unit (73) is so positioned that the bubble (77) is at the height of the light path between each transmitter LED (55) and phototransistor (65). As the camera (21) is transversely tilted, the bubble (77) moves in the container (75) and unblocks a light path in one or two of the modules (51) while all other light paths are blocked.

Each module (51) is part of a detector element (79), and there are seven (7) detector elements (79) in the detector (47) as shown in FIG. 4. Each detector element (79) includes a subcircuit (81) including an output transistor (83), a pair of input leads (85) and (87) and a pair of output leads (89) and (91). One input lead (85) of each element (79) is connected to a common source of positive voltage (not shown) through a resistor (86). The other input lead (87) is connected to a common ground (88). The output leads (89) and (91) are connected to the indicator LEDs (93) and (93A) of the tilt indicator (44) by a cable or wire bundle (92) shown in FIG. 1.

The tilt indicator (44) consists essentially of a linear array of indicator LEDs (93) and (93A) arranged horizontally below the viewing screen (41) in the viewfinder (37). The indicator LEDs (93) and (93A) are connected in the same order from left to right as are the transmitter LEDs (55) in the detector (47). The center indicator LED (93) emits green light to indicate a level, non-tilted transverse condition; while the remaining indicator LEDs (93A) emit red light to indicate a non-level tilted condition. One of the output leads (91) of each element (79) is connected to a common source of positive voltage (not shown).

In use, the camera operator uses the camera in the normal way. As the transverse axis or plane is tilted to the right or left, the bubble (77) in the container (75) will move to the right or left unblocking one or two of the light paths and lighting up one or two of the indicator LEDs (93) and (93A). Each combination of a module (51) and an indicator LED represent an angular increment of tilt in a plurality of successive angular increments. This angular increment is built into the design of the detector. Thus, each angular increment may be 2 degrees; in which case, the center indicator LED would represent zero degrees, plus or minus one degree, and each of the other indicator LEDs would represent two degrees of additional tilt as compared with its adjacent indicator LED.

The indicator LEDs (93) and (93A) which comprise the tilt indicator (44) are positioned in linear array in the indicator area (43), so that they are viewable through the eyepiece (45). The transverse plane is referenced to gravity by the detector (47). The camera operator can see by the tilt indicator whether the camera is about level, or is tilted slightly or is substantially tilted in the transverse direction by a mere glance at the tilt indicator, while continuing to monitor the viewing screen of the picture tube in the view finder. The detector and indicator are of simple construction using inexpensive LEDs and optocoupled interrupter modules. The power source for the circuit is readily available in the camera. The electrical connections between the detector and the indicator can be realized with a conventional wire bundle. In the embodiment shown in FIGS. 1 to 4, only one or two of the indicator LEDs are in the "on" condition and, by the position of the "on" LED, the operator can distinguish the seven (7) angular increments. Hence, all of the indicator LEDs can emit in the same color if desired. An alternative is to have the middle indicator LED to emit in one color, such as green, to indicate a non-tilted condition and the other indicator LEDs to emit in a different color, such as red, to indicate a tilted condition. In still another alternative, the middle indicator LED can emit in "green" to indicate a non-tilted condition, the adjacent LEDs can emit in "amber" to indicate a slightly tilted condition, and the outboard indicator LEDs can emit in "red" to indicate a greatly tilted condition.

The foregoing figures and descriptions thereof are provided as illustrative of some of the preferred embodiments of the concepts of this invention. While these embodiments represent what is regarded as the best modes for practicing this invention, they are not intended as delineating the scope of the invention, which is set forth in the following claims.

What is claimed is:

1. In a video camera comprising an optical-to-electronic image conversion means having a longitudinal optical axis and a viewfinder cooperating with said conversion means, the improvement comprising (A) a detector in said camera for detecting the transverse tilt of said camera in one of a plurality of successive angular increments, and (B) a plurality of light-emitting diodes arranged in an ordered array, said light-emitting diodes being responsive to said detector to indicate the transverse tilt of the camera in one of said detected angular increments, said light-emitting diodes being viewable in said viewfinder.

2. The camera defined in claim 1 wherein said viewfinder includes a video picture tube and said light-emitting diodes are arranged in a linear array adjacent to said picture tube.

3. The camera defined in claim 2 wherin said ordered array includes a center diode for indicating the transverse tilt of the camera in a substantially non-tilted angular tilt increment, an adjacent diode on each side thereof for indicating the transverse tilt of the camera in the adjacent angular tilt increment, and an outboard diode on the side of each said adjacent diodes for indicating the transverse tilt of the camera in the adjacent greatly tilted outboard angular tilt increment.

4. The camera defined in claim 3 wherein said angular increments each cover about two degrees of arc.

5. The camera defined in claim 3 wherein said center diode emits light in one color and said adjacent and outboard diodes emit light in another color.

6. In a portable video camera, comprising an optical-to-electronic conversions means having a longitudinal optical axis, a viewfinder cooperating with said conversion means, said viewfinder including a video display, an indicator area adjacent to said video display and a single means for viewing said video display and indicator area, the improvement comprising (A) a tilt detector in said camera for detecting the transverse tilt of said camera in one of a plurality of successive angular increments relative to a plumb line, and (B) a tilt indicator comprising a plurality of light-emitting diodes, there being a light-emitting diode for indicating the transverse tilt of the camera in each said angular increment, said diodes being responsive to said detector and being arranged in a horizontal linear array in said indicator area to be viewable in said viewfinder.

7. The camera defined in claim 6 wherein said detector is responsive to gravity.

8. The camera defined in claim 7 wherein said detector includes a separate optocoupled module connected to a respective one of said diodes for indicating the transverse tilt of the camera in each said angular increments.

* * * * *